(12) United States Patent
Kaiser et al.

(10) Patent No.: US 8,124,189 B2
(45) Date of Patent: Feb. 28, 2012

(54) HYDROPHOBIC COATING SYSTEMS, SUSPENSIONS FOR FORMING HYDROPHOBIC COATINGS, AND METHODS FOR FABRICATING HYDROPHOBIC COATINGS

(75) Inventors: Mark Kaiser, Prospect Heights, IL (US); Belinda S. Foor, Chicago, IL (US)

(73) Assignee: Honeywell International Inc., Morristown, NJ (US)

(*) Notice: Subject to any disclaimer, the term of this patent is extended or adjusted under 35 U.S.C. 154(b) by 793 days.

(21) Appl. No.: 12/015,312

(22) Filed: Jan. 16, 2008

(65) Prior Publication Data

US 2009/0181237 A1 Jul. 16, 2009

(51) Int. Cl.
*B05D 3/02* (2006.01)

(52) U.S. Cl. ............... 427/385.5; 427/421.1; 427/427.4

(58) Field of Classification Search .................. None
See application file for complete search history.

(56) References Cited

U.S. PATENT DOCUMENTS

| | | | |
|---|---|---|---|
| 3,354,022 A | 11/1967 | Dettre et al. | |
| 3,931,428 A | 1/1976 | Reick | |
| 5,378,521 A | 1/1995 | Ogawa et al. | |
| 5,965,256 A | 10/1999 | Barrera | |
| 5,976,702 A | 11/1999 | Yoneda et al. | |
| 6,428,722 B1* | 8/2002 | Furuya | 252/510 |
| 6,627,035 B2* | 9/2003 | Fan et al. | 156/308.2 |
| 6,649,266 B1 | 11/2003 | Gross et al. | |
| 6,660,363 B1 | 12/2003 | Barthlott | |
| 6,764,745 B1 | 7/2004 | Karasawa et al. | |
| 6,767,587 B1 | 7/2004 | Brown | |
| 6,800,354 B2 | 10/2004 | Baumann et al. | |
| 6,811,856 B2 | 11/2004 | Nun et al. | |
| 7,037,591 B2 | 5/2006 | Henze et al. | |
| 7,083,828 B2 | 8/2006 | Muller et al. | |
| 7,196,043 B2 | 3/2007 | Valpey, III et al. | |
| 7,258,731 B2 | 8/2007 | D'Urso et al. | |
| 2002/0016433 A1 | 2/2002 | Keller et al. | |
| 2003/0130114 A1* | 7/2003 | Hampden-Smith et al. | 502/180 |
| 2006/0199013 A1 | 9/2006 | Malshe et al. | |
| 2006/0281861 A1 | 12/2006 | Putnam | |

FOREIGN PATENT DOCUMENTS

IN 181963 * 11/1998

OTHER PUBLICATIONS

Abstracts and partial machine translation of JP2005-343016, Dec. 2005.*
Abstracts and translation of CN 1697217, Nov. 2005.*

* cited by examiner

*Primary Examiner* — Erma Cameron
(74) *Attorney, Agent, or Firm* — Ingrassia Fisher & Lorenz, P.C.

(57) ABSTRACT

Hydrophobic coating systems, suspensions for forming hydrophobic coatings, and methods for fabricating hydrophobic coatings are provided. In an exemplary embodiment, a hydrophobic coating system comprises a substrate and a hydrophobic coating disposed on the substrate. The hydrophobic coating comprises agglomerates formed of a fluorinated polymer and a plurality of chemically inert particles having an average size of no greater than about 0.1 μm. The hydrophobic coating exhibits contact angles greater than about 90 degrees.

14 Claims, 1 Drawing Sheet

HYDROPHOBIC COATING SYSTEMS, SUSPENSIONS FOR FORMING HYDROPHOBIC COATINGS, AND METHODS FOR FABRICATING HYDROPHOBIC COATINGS

FIELD OF THE INVENTION

The present invention generally relates to hydrophobic coatings, suspensions for forming hydrophobic coatings, and methods for fabricating hydrophobic coatings, and more particularly relates to systems with spray-applied, temperature-stable hydrophobic coatings, suspensions for forming hydrophobic coatings, and methods for fabricating hydrophobic coatings.

BACKGROUND OF THE INVENTION

Acoustic materials are used for many applications, such as, for example, to dampen noise created by engines of aerospace vehicles and other aircraft. However, often in such applications, the acoustic materials are subjected to high moisture-content environments that also may comprise high levels of hydrocarbons. The acoustic materials are, by nature, of extremely low density and are highly absorbent of compounds with which they come in contact. Once saturated by a compound, the acoustic properties of the acoustic materials are significantly diminished.

The acoustic materials used in aerospace and aircraft applications would benefit significantly from an effective hydrophobic coating that renders the acoustic materials to which it is applied resistant to saturation by water and hydrocarbons. However, while commercial hydrophobic materials are available, to be effective in applications such as aerospace, the hydrophobic coating should be able to withstand temperatures of greater than about 350° C. and to endure temperature cycling. Present-day hydrophobic coatings typically do not meet such specifications. In addition, a hydrophobic coating that is cost-efficient to prepare and easy to apply to acoustic materials would offer a significant advantage over other commercially available materials.

Accordingly, it is desirable to provide hydrophobic coating systems with hydrophobic coatings that can be applied by spraying and are stable at temperatures greater than about 350° C. In addition, it is desirable to provide suspensions for forming such hydrophobic coatings. In addition, it is desirable to provide methods for fabricating such hydrophobic coatings. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Hydrophobic coating systems, suspensions for forming hydrophobic coatings, and methods for fabricating hydrophobic coatings are provided. In accordance with an exemplary embodiment of the present invention, a hydrophobic coating system comprises a substrate and a hydrophobic coating disposed on the substrate. The hydrophobic coating comprises agglomerates formed of a fluorinated polymer and a plurality of chemically inert particles having an average size of no greater than about 0.1 μm. The hydrophobic coating exhibits contact angles greater than about 90 degrees.

In accordance with an exemplary embodiment of the present invention, a method for forming a hydrophobic coating on a substrate is provided. The method comprises the steps of forming a suspension by combining water, a volatile solvent, a fluorinated polymer resin, and a plurality of chemically inert particles having an average size of no greater than about 0.1 μm. The suspension is mixed to form a homogeneous ink, and the homogeneous ink is sprayed onto the substrate and thermally treated.

In accordance with an exemplary embodiment of the present invention, a suspension for forming a hydrophobic coating is provided. The suspension comprises water, a volatile solvent, a plurality of fluorinated polymer particles, and a plurality of chemically inert particles having an average size of no greater than about 0.1 μm.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
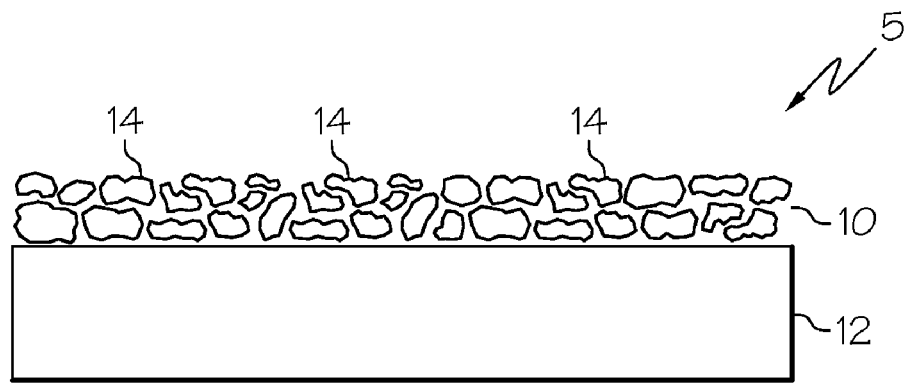
FIG. 1 is a schematic, cross-sectional view of a hydrophobic coating overlying a substrate, in accordance with an exemplary embodiment of the present invention.

FIG. 1 is a schematic, cross-sectional view of a hydrophobic coating system 5, in accordance with an exemplary embodiment of the present invention, having a hydrophobic coating 10 that is disposed on a substrate 12. The substrate 12 may be any structured or semi-rigid surface, such as, for example, foam, cloth, metal, plastics, wood, and the like, that would benefit from a hydrophobic coating. In particular, the substrate may be an acoustic material, such as those used in aerospace and aircraft applications, with acoustic properties that may significantly diminish or otherwise be adversely affected by the absorption of water and/or hydrocarbons. The hydrophobic coating 10 is configured so that it renders the substrate 12 resistant to saturation by these compounds without adversely affecting the acoustic, structural, or other properties of the substrate. In particular, the hydrophobic coating 10 is super-hydrophobic, demonstrating contact angles greater than about 90 degrees. The hydrophobic coating 10 comprises agglomerates 14 of a fluorinated polymer and chemically inert particles. Without intending to be bound by theory, it is believed that the agglomerates of the fluorinated polymer and the chemically inert particles result in a relatively rough surface that causes a lotus effect on the surface. The intrinsically super-hydrophobic surface avoids an attractive capillary force that would otherwise pull moisture to the substrate surface. Additionally, the hydrophobic coating is stable at temperatures of about 260° C. to about 350° C. and even greater and can withstand temperature cycling with minimal or no degradation of its hydrophobic properties. As discussed in more detail below, because the hydrophobic coating 10 is formulated so that it is applied to the substrate by spraying, it is a relatively low cost coating that is easily applied in production.

In accordance with an exemplary embodiment of the present invention, a method 20 for fabricating a hydrophobic coating, such as the hydrophobic coating 10 of FIG. 1, on a substrate begins with the formation of a hydrophobic coating suspension (step 22). The suspension is formed by adding together a fluorinated polymer resin, a plurality of chemically inert particles that have an average size or dimension of no greater than about 0.1 µm, a diluent, and water. The fluorinated polymer resin preferably comprises fluorinated ethylene propylene particles suspended in a dispersion. One example of a fluorinated polymer resin suitable for use in the suspension is Teflon® FEP 121A, available from Dupont Fluoroproducts of Wilmington, Del., which comprises fluorinated ethylene propylene (FEP) particles suspended in a water and alcohol dispersion. In an exemplary embodiment, the fluorinated polymer resin comprises about 6 to about 14 weight percent (wt. %) of the suspension. In a preferred embodiment, the fluorinated polymer resin comprises about 9 wt. % of the suspension.

The chemically inert particles comprise chemically inert, ultrafine powder particles having an average size of no greater than about 0.1 µm. Examples of ultrafine powders suitable for use in the suspension include carbon black, alumina, titania, silica, and the like. In an exemplary embodiment of the invention, the chemically inert particles are particles of carbon black such as, Black Pearls® 2000 available from Cabot Corporation of Charlotte, N.C. In another exemplary embodiment, the chemically inert particles comprise combinations of ultrafine powders. For example, the chemically inert particles may comprise a mixture of carbon black and titania, a mixture of carbon black and alumina, a mixture of carbon black, alumina, and titania, and the like. In a preferred embodiment of the present invention, the mixture of chemically inert particles comprises equal parts of the powders that form the mixture. The chemically inert particles are present in an amount that achieves the desired hydrophobicity of the hydrophobic coating but is not so large that it results in poor adhesion and, hence, significant sloughing of the hydrophobic coating from the substrate.

Diluents suitable for use in the suspension comprise any suitable pure fluid or mixture of fluids that is capable of forming a suspension with the fluorinated polymer resin and that can be volatilized at a desired temperature, such as the critical temperature. Contemplated solvents are those that are easily removed within the context of the applications disclosed herein. For example, contemplated solvents comprise relatively low boiling points as compared to the boiling points of precursor components. In some embodiments, contemplated solvents have a boiling point of less than about 350° C. Suitable solvents comprise any single or mixture of organic, organometallic, or inorganic molecules that are volatized at a desired temperature. In one exemplary embodiment, the diluent comprises one or more alcohols, such as, for example, isopropanol, propanol, methanol, and the like. Other volatile hydrocarbons also may be used. However, it is preferable to utilize alcohols to reduce the possibility that the fluorinated polymer will drop out of suspension or that residual organic material will be left on the surface, which would adversely affect the hydrophobicity of the resulting coating. In another exemplary embodiment, to prevent agglomeration of the fluorinated polymer particles out of the suspension, the diluent has a chemical formulation substantially similar to the formulation of the dispersion within which the fluorinated ethylene propylene particles are suspended in the fluorinated polymer resin. The diluent is present in a sufficient amount so that the fluorinated polymer particles cannot form a significant number of large agglomerates that deposit out of the suspension before application of the suspension to the substrate. Water also is added to the suspension to decrease its viscosity. However, the water should be present in an amount less than the amount that would cause the substrate to become saturated with the water so that the resulting coating cannot adhere sufficiently to the substrate surface. In a preferred embodiment of the present invention, the water is deionized water.

Figure 2:
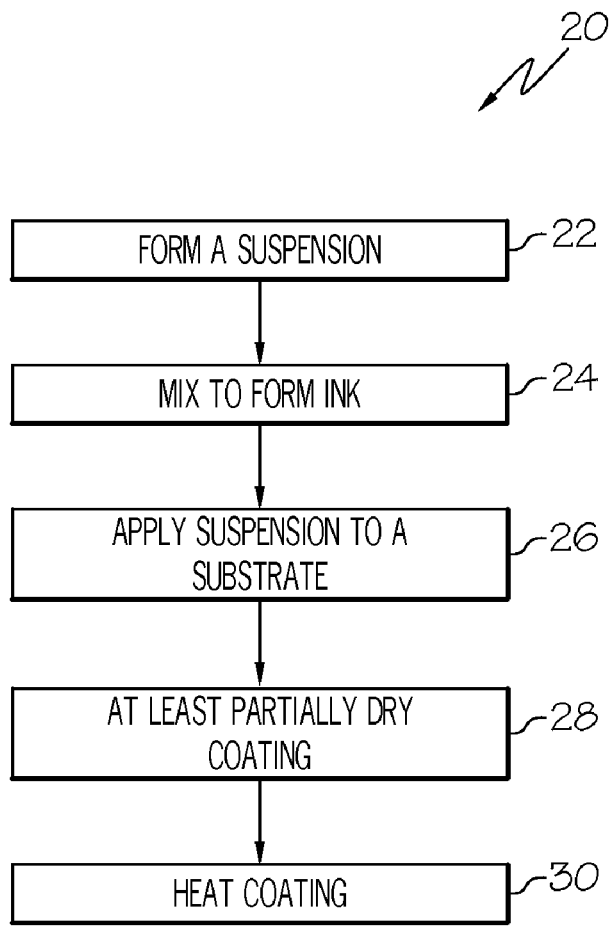
FIG. 2 is a flow chart of a method for fabricating a hydrophobic coating overlying a substrate, in accordance with an exemplary embodiment of the present invention.

The components of the suspension are mixed using any suitable mixing or stirring process that forms a homogeneous ink of the fluorinated polymer particles and the chemically inert particles in the diluent and water (step 24). For example, a low speed sonicator or a high shear mixing apparatus, such as a homogenizer, a microfluidizer, a cowls blade high shear mixer, an automated media mill, or a ball mill, may be used for several seconds to several hours or more, depending on the intensity of the mixing, to form the ink. Heat also may be used to facilitate formation of the ink, although the heating should be undertaken at conditions that avoid the vaporization of the diluent and the water. While the step of mixing to form the ink (step 24) is illustrated in FIG. 2 as being performed after the step of forming the suspension (step 22), it will be appreciated that the steps can be performed simultaneously with the suspension being mixed as the components are added thereto.

The ink is sprayed onto the substrate using any suitable spray device that permits the application of a substantially uniform layer of the ink on the substrate (step 26). The ink may be applied in one layer or, preferably, in multiple layers to achieve a predetermined thickness. After application of each layer of ink, the diluent is permitted to at least partially evaporate to dry the ink. In this regard, the remaining coating has a sufficiently high viscosity so that the fluorinated polymer particles and the chemically inert particles are no longer mobile in the coating on the substrate, do not move under their own weight when subjected to gravity, and are not moved by surface forces within the coating (step 26). In an exemplary embodiment of the present invention, the ink is applied so that the resulting hydrophobic coating has a thickness no greater than about 12 to 13 µm (about 0.5 mils). In another exemplary embodiment, the ink is applied to the substrate so that it has a total loading on the substrate in the range of about 0.5 mg/cm$^2$ to about 3.0 mg/cm$^2$.

The method continues with the heating of the coating so that the fluorinated polymer particles and the chemically inert particles form agglomerates that adhere to the surface of the substrate and to each other. Any remaining diluent and water also may be removed during this heating step. In an exemplary embodiment, the coating is placed in an oven that then is ramped up to a temperature sufficient to cure the fluorinated polymer. The coating is heated for a time sufficient to cure the coating and permit the agglomerates to form and adhere to the substrate and to each other.

The following are examples of hydrophobic coating systems formed in accordance with an exemplary embodiment of the present invention. The hydrophobic coatings of both examples exhibited contact angles greater than about 120° using a Kruss K121 tensiometer, available from Kruss USA of Matthews, N.C. The examples are provided for illustration purposes only and are not meant to limit the various embodiments of the present invention in any way.

EXAMPLE 1

In an exemplary embodiment of the present invention, a suspension was formed by adding together 25 grams (g) of Teflon® FEP 121A, 4.1 g of Cabot Black Pearl® 2000 carbon black, 50 g of diluent, and 75 g deionized water in a non-reactive vessel. To minimize settling of the fluorinated polymer particles out of the suspension, the diluent was formulated to have a composition similar to the composition of the dispersion within which the fluorinated polymer particles were suspended in the FEP 121A resin. In this regard, the diluent was prepared by mixing 64 wt. % isopropanol, 35 wt.

% n-propanol, and 1 wt. % methanol. Thirty milling balls were added to the suspension, which then was ball milled for approximately four hours to form an ink. The ink was sprayed onto an aluminum substrate using a Badger Model 400 spray gun available from Badger Airbrush Company of Franklin Park, Ill. Multiple layers of the ink were sprayed onto the substrate, with each layer permitted to dry to the touch before the subsequent layer was applied, until an average thickness of about 12 to about 13 μm was achieved. The coated substrate then was placed in an oven, the temperature of the oven was ramped up to 350° C. at 5° C./minute, and the coated substrate was baked for about 2 hours.

EXAMPLE 2

In another exemplary embodiment of the present invention, a suspension was formed by adding together 25 grams (g) of Teflon® FEP 121A, about 2 g of Cabot Black Pearl® 2000 carbon black, about 2 g of titania, 50 g of diluent, and 75 g deionized water in a non-reactive vessel. The diluent was formulated as described above with regard to Example 1. Thirty milling balls were added to the suspension, which then was ball milled for approximately four hours to form an ink. The ink was sprayed onto an aluminum substrate using a Badger Model 400 spray gun available from Badger Airbrush Company of Franklin Park, Ill. Multiple layers of the ink were sprayed onto the substrate, with each layer permitted to dry to the touch before the subsequent layer was applied, until an average thickness of about 12 to about 13 μm was achieved. The coated substrate then was placed in an oven, the temperature of the oven was ramped up to 350° C. at 5° C./minute, and the coated substrate was baked for about 2 hours.

Accordingly, spray-applied, temperature-stable hydrophobic coatings of hydrophobic coating systems, suspensions for forming such hydrophobic coatings, and methods for fabricating such hydrophobic coatings have been provided. The hydrophobic coatings are formulated so that they render a substrate, such as an acoustic substrate, resistant to saturation by moisture and offer some resistance to hydrocarbons without adversely affecting the acoustic, structural, or other properties of the substrate. In particular, the hydrophobic coatings demonstrate contact angles greater than 90 degrees. Additionally, the hydrophobic coatings are stable at temperatures of about 260° C. to about 350° C. and even greater and can withstand temperature cycling with minimal or no degradation of its hydrophobic properties. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for forming a hydrophobic coating on an acoustic substrate, the method comprising the steps of:
    forming a suspension by combining:
        water;
        a volatile solvent;
        a fluorinated polymer resin; and
        a plurality of chemically inert particles having an average size of no greater than about 0.1 μm;
    mixing the suspension to form a homogeneous ink;
    spraying the homogeneous ink onto the acoustic substrate; and
    thermally treating the homogeneous ink to cause agglomerates of particles of the fluorinated polymer resin and the chemically inert particles to form and adhere to the acoustic substrate.

2. The method of claim 1, wherein the steps of forming and mixing are performed simultaneously.

3. The method of claim 1, wherein the step of forming the suspension comprises the step of forming the suspension by combining the water, the fluorinated polymer resin, the plurality of chemically inert particles, and the volatile solvent comprising an alcohol.

4. The method of claim 1, wherein the step of forming the suspension comprises the step of forming the suspension so that the fluorinated polymer resin is present in an amount in the range of about 6 wt. % to about 14 wt. % of the suspension.

5. The method of claim 4, wherein the step of forming the suspension comprises the step of forming the suspension with the fluorinated polymer resin present in an amount of about 9 wt. % of the suspension.

6. The method of claim 1, wherein the step of forming the suspension comprises the step of forming the suspension by combining the water, the volatile solvent, the fluorinated polymer resin, and the plurality of chemically inert particles comprising carbon black.

7. The method of claim 1, wherein the step of forming the suspension comprises the step of forming the suspension by combining the water, the volatile solvent, the fluorinated polymer resin, and the plurality of chemically inert particles comprising titania.

8. The method of claim 1, wherein the step of forming the suspension comprises the step of forming the suspension by combining the water, the volatile solvent, the fluorinated polymer resin, and the plurality of chemically inert particles comprising alumina.

9. The method of claim 1, wherein the step of forming the suspension comprises the step of forming the suspension by combining the water, the volatile solvent, the fluorinated polymer resin, and the plurality of chemically inert particles comprising a mixture of at least two ultrafine powders selected from the group consisting of carbon black, titania, and alumina.

10. The method of claim 9, wherein the step of forming the suspension comprises the step of forming the suspension by combining the water, the volatile solvent, the fluorinated polymer resin, and the plurality of chemically inert particles comprising equal parts of the at least two ultrafine powders.

11. The method of claim 1, wherein the step of spraying comprises the step of spraying the homogeneous ink onto the acoustic substrate in layers, wherein each layer of the homogeneous ink is permitted to dry before application of a subsequent layer.

12. The method of claim 1, wherein the step of spraying comprises the step of spraying the homogeneous ink so that the hydrophobic coating has a thickness that is no greater than about 12 to about 13 μm.

13. The method of claim 1, wherein the step of spraying comprises the step of spraying the homogeneous ink onto the acoustic substrate so that, after the step of spraying and before the step of thermally treating, the homogeneous ink is present on the substrate in an amount of about 0.5 mg/cm$^2$ to about 3 mg/cm$^2$.

14. The method of claim 1, wherein the step of forming the suspension comprises the step of forming the suspension by combining the water, the volatile solvent, the plurality of chemically inert particles, and fluorinated ethylene propylene particles.

* * * * *